Feb. 16, 1954 — T. S. SAJATOVICH — 2,669,022
CONICGRAPH
Filed June 25, 1949 — 4 Sheets-Sheet 3

INVENTOR.
THOMAS S. SAJATOVICH

Feb. 16, 1954 T. S. SAJATOVICH 2,669,022
CONICGRAPH
Filed June 25, 1949 4 Sheets-Sheet 4

INVENTOR.
THOMAS S. SAJATOVICH
BY

Patented Feb. 16, 1954

2,669,022

UNITED STATES PATENT OFFICE 2,669,022

CONICGRAPH

Thomas S. Sajatovich, Cleveland, Ohio

Application June 25, 1949, Serial No. 101,319

4 Claims. (Cl. 33—27)

This invention relates to an improvement in conicgraphs and, more particularly, to a drafting instrument which permits the scribing of mathematically precise hyperbolic and parabolic conic sections.

Heretofore the precise scribing of hyperbolas and parabolas of mathematically correct curvatures for the focus, center, and vertex of the curves has presented an extremely difficult problem in designing and production drafting and has required advanced mathematical computations far beyond the capabilities of most graduate engineers, let alone the capabilities of skilled design and production draftsmen. The scribing of a parabola is actually merely tedious rather than difficult, since it involves merely the location of points equidistant from a focus and a directrix, the location and direction of the directrix following from the two determining points, the focus and vertex, since but one parabola may exist for a given vertex and a given focus. The scribing of a given hyperbola, however, is considerably more difficult, since an infinite number of hyperbolas may have the same vertex and focus, three points, vertex, focus, and center, determining a given hyperbola. It was generally prior practice to determine a few of the points on the desired curve and then fair in the curve from these points with a French curve. Such an eventual empirical scribing of the desired parabola or hyperbola necessarily resulted in inaccuracies and errors where the curves were employed in designing parts for scientific instruments or military, electrical, and radio devices.

It is a particular object and advantage of my invention to provide a conic section drafting instrument which will, in the case of a parabola, permit the curve to be quickly and easily scribed, the vertex and focus being known, or, but one of these points being known, the other point may be arbitrarily selected, as good design or proportion may dictate, and the corresponding curve may be selected. In the case of a hyperbola with a known vertex, focus and center, the instrument may be set to these points and the resultant curve scribed, or if only two of these points are known or selected, the instrument may be operated to scribe a true hyperbola, the third point then being locatable from the curve by means of the instrument.

Another object and advantage of my invention is to provide a novel scriber for pen or pencil which will be normal to the plane of the curves at all loci within the dimensional limits of the instrument, thereby avoiding inaccuracies caused by efforts to maintain the scriber at an operative scribing angle throughout the movement of the scribing arm. Another object of my invention is to provide a novel bearing permitting relatively frictionless longitudinal and rotational movement of the scribing arm while the curve is being scribed. These subcombinations are useful in all types of conicgraphic instruments, including ellipsographs as well as instruments for scribing hyperbolas and parabolas. In fact, employment of these subcombinations in known types of ellipsographs render such instruments, otherwise difficult or even impractical to operate, simple and easy to employ.

Other and further objects and advantages of my invention will be apparent from the following specification, the claims, and the drawings showing a preferred embodiment of my invention, in which Fig. 1 is a side elevation of the instrument arranged for drafting a hyperbola.

For purpose of definition and explanation of the principle of my instrument, it should be borne in mind that a parabola is the curve defined by a plane intersecting a cone where the plane is parallel to an element of the cone; a hyperbola is the curve defined by a plane intersecting a cone where the plane is parallel to the axis of the cone.

My instrument is based on the mathematical principle that for either a parabola or a hyperbola there may be constructed within the cone a sphere which is tangent to the cone and to the intersecting plane at the focus of the curve. Since the center of a hyperbola is, by definition, the projection of the apex of the cone upon the intersecting plane, the vertex of the curve is the point defined by the element of the cone which intersects the line between the center and the focus. In a parabola the vertex is simply the point on the curve nearest the focus, and, thus, is the point located by the intersection of the intersecting plane and the shortest element of the intersected cone.

Figure 1:
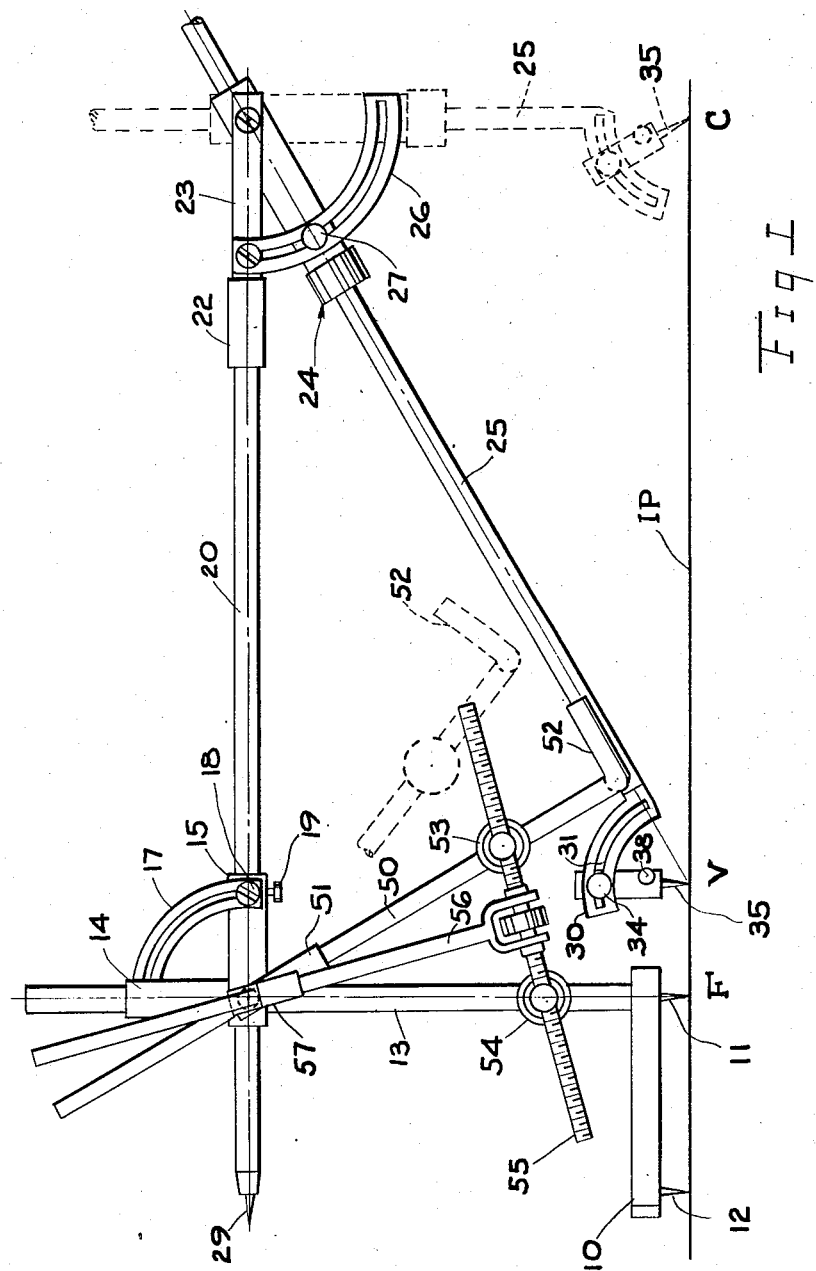

As shown in Figure 1, arranged for scribing a hyperbola, my instrument comprises a base 10 having a focus point 11 adapted to be set on the focus F of the intersecting plane IP (usually the sheet of paper, metal, or the like upon which the hyperbola is to be scribed). The base 10 is provided with outrigger points 12 to stabilize it. Extending perpendicularly above the base 10 is a center post 13 carrying the vertically slidable center bearing 14 on which is pivoted the axial bearing 15, the post 13 being offset with respect to the focus point 11 so that the intersection of the center line of the pivot for the axial bearing and the center line of the axial bearing will be perpendicularly above the focus point 11. The said intersection represents the center of the above mentioned constructed sphere. To prevent the said sphere center intersection from being twisted out of alignment with the focus point, the center bearing 14 and the post 13 are preferably provided with mating flats, against which the set screw 16 may bear in order to maintain the center bearing at the desired elevation.

The angularity of the pivoted axial bearing 15 with respect to the center bearing 14 may be set by means of the center quadrant arm 17 carried by the bearing 14 and the set screw 18 carried by the bearing 15. In Fig. 1 the axial bearing 15 is set at right angles to the bearing 14 so that the axis rod 20, slidably journaled in the bearing 15 and representing the axis of the intersected cone, may be parallel to the intersecting plane IP, as is necessary by definition of the hyperbola to be scribed. The axis rod 20 may be fixed in the bearing 15 by means of the set screw 19.

One end of the rod 20 carries a pilot shaft 21 on which is freely rotatably mounted the apex fork bearing 22 carrying the apex fork 23, in which is pivoted the scriber or element arm bearing 24. The scriber arm 25 is slidably and rotatably journaled in the bearing 24, the intersection of the center line of the axis rod 20 and the center line of the scriber arm 25 representing the apex of the intersected cone. The angularity of the scriber arm bearing 24 with respect to the axis rod 20 is adjustably fixed by means of the apex quadrant 26 carried by the fork 23 and the set screw 27 carried by the bearing 24. With the angularity of the scriber arm so fixed, when the fork 23 is rotated on the pilot shaft 21, the scriber arm 25 thus generates a cone about the axis rod 20 and wherever the center line of the scriber arm intersects the plane IP, therefore, the locus of the points of intersection will be a hyperbola.

Figures 4, 5, 6:
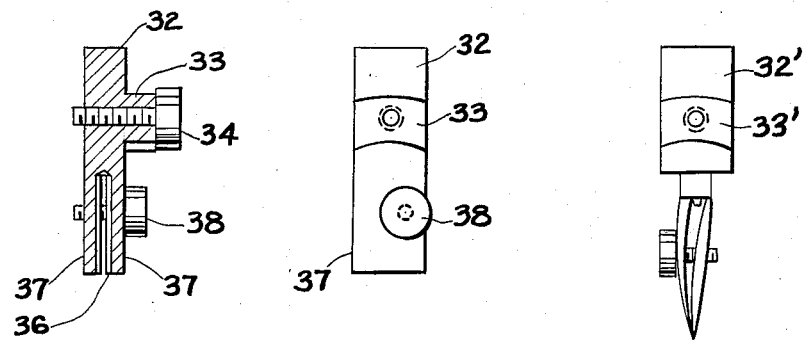
Fig. 4 is a detail cross-section of the pencil scriber (without lead and quadrant) taken along the line 4—4 of Fig. 3.
Fig. 5 is a detail side elevation of the scriber shown in section in Fig. 4.
Fig. 6 is a modification of the scriber shown in Fig. 5, said modification carrying an ink pen.
Figure 7:
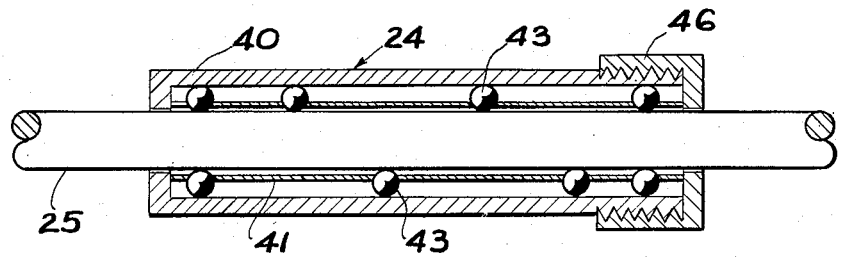
Fig. 7 is a detail cross-section of the scriber arm bearing.

To permit a curve to be scribed along the locus of points of intersection of the center line of the scriber arm 25 and the plane IP, the end of the arm 25 carries a rotatably mounted scriber quadrant 30 provided with an arcuate slot 31 concentric about a point on the extended center line of the arm 25. As shown in Figs. 4 and 5, a scriber 32 is provided and comprises a block provided with an arcuate boss 33 adapted to slide in the slot 31. The boss 33 is tapped to receive a set-screw 34 so that the radial position of the scriber 32 in the quadrant 30 may be adjusted. The lower end of the scriber is drilled radially to provide a receiving socket 36 for a lead 35 and is slit to provide jaws 37 which may be closed by a thumbscrew 38 to grip the lead 35. In use, a sharpened lead is adjusted in the jaws 37 so that distance from the point of the lead to the set-screw 34 is equal to the radius of the slot 31. The point of the lead 35 thus coincides with the intersection of the center line of the quadrant arm 25 and the plane IP. By selecting a suitable angle for the scriber 32 in the quadrant 30, lead will be at the proper angle to scribe a sharp line throughout most hyperbolas. If the hyperbola is large or so sharply curved that the angle of the lead to the plane changes appreciably in scribing the hyperbola, the angle of the scriber in the quadrant may be changed while the hyperbola is being scribed without affecting the accuracy of the curve.

A sharpened scribing point instead of a lead 35 may be used in the scriber 32 if the curve is to be scribed on metal, for example. If it is desired to scribe the hyperbola in ink, a rotatable pen-equipped scriber 32', as shown in Fig. 6, may be substituted.

Figure 8:
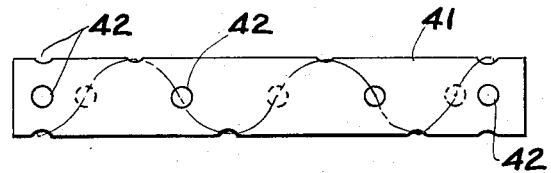
Fig. 8 is a detail of the bearing sleeve shown in section in Fig. 7.

As the curve is scribed, it is evident that the scriber arm 25 will move longitudinally in the bearing 24 and, in order to maintain the scriber in a vertical position, the arm 25 will also be turned. Such movement should be substantially frictionless and yet the arm 25 must be accurately centered in the bearing. To accomplish such frictionless coaxial movement of the arm 25 in the bearing 24, the bearing 24 is comprised of a shell 40 carrying a sleeve 41. The ends of the sleeve are ringed with ball openings 42 and additional ball openings 42 are located helically around the sleeve between the end openings, as shown in Fig. 8. Ball bearings 43 center the arm 25 precisely coaxially in the shell 40, being spaced from each other by the sleeve 41. It should be noted that the diameter of the ball openings 42 is slightly less than the diameter of the balls 43 and that the radius of the sleeve 41 is slightly less than the distance from the center of the balls 43 to the axis of the arm 25. Thus, the balls are retained in the bearing 24 even though the arm 25 may be removed therefrom. The sleeve 41 is held in the shell 40 by means of the cap 46.

If the definite hyperbola must be scribed for a known focus, vertex and center, the radius arm 50 must be employed. The radius arm 50 is slidably journaled in the bearing 51 pivoted on the center bearing 14 concentrically with the axial bearing 15. The lower end of the radius arm 50 is provided with an offset foot 52 adapted to fit over the scriber arm 25, the foot 52 being at right angles to the arm 50. The arm 50 carries a pivot nut 53 and a second oppositely threaded pivot nut 54 is carried by the center post 13, the perpendicular distance from the center line of the scriber arm 25 to the pivot nut 53 being equal to the distance from the focus point 11 to the pivot nut 54. The pivot nuts 53 and 54 receive oppositely threaded ends of the bisector screw 55 which is carried by the forked bisector arm 56. The forked end of the bisector arm is located equidistant between the nuts 53 and 54 and is slidably journaled in the bearing 57, also pivoted on the center bearing 14 concentrically with the axial bearing 15 and the radius arm bearing 51. The length of the radius arm is thus always equal to the radius of the aforesaid constructed sphere.

Figure 2:
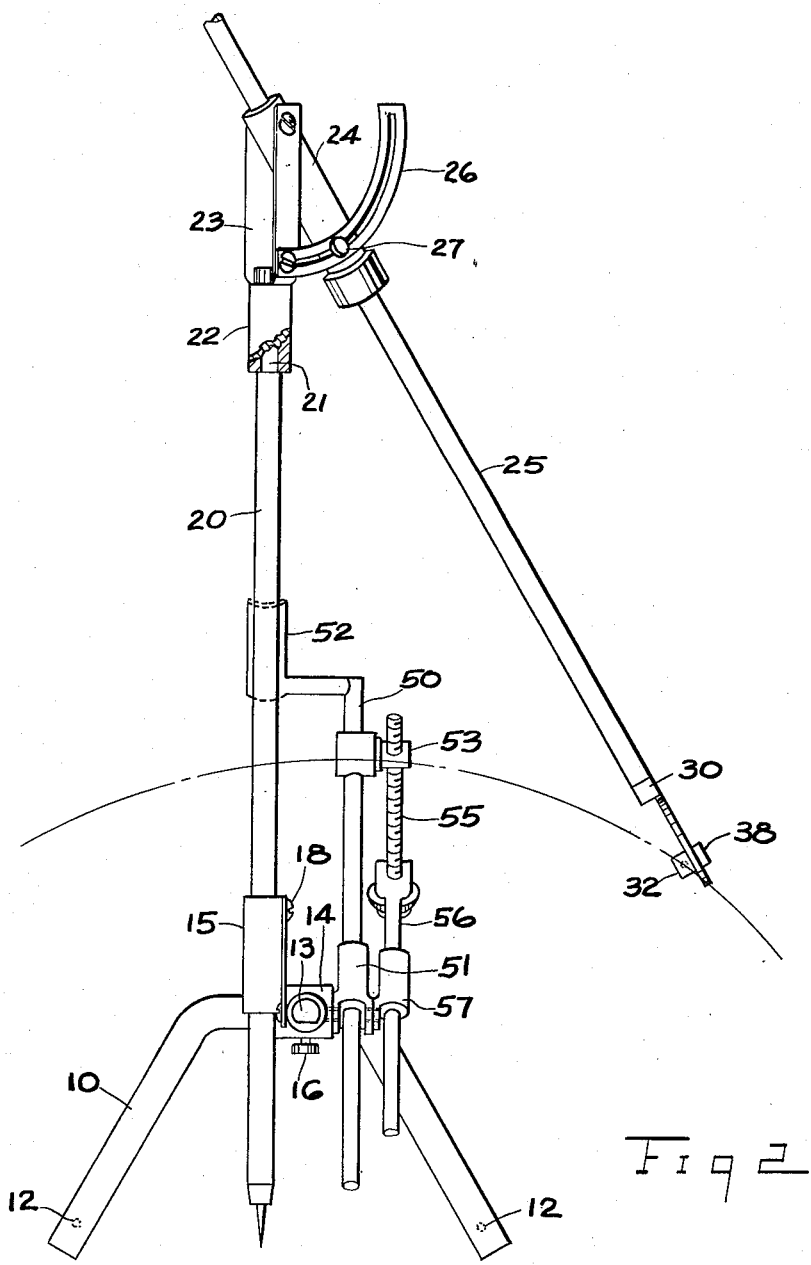
Fig. 2 is a plan view of the instrument as shown in Fig. 1, but partly broken away and with the scribing arm swung to a position assumed in scribing the hyperbola shown.

With the focus point 11 set on the focus F and the effective length of the axis rod 20 set to the distance between F and the center C, the altitude of the center bearing 14 is adjusted until the scriber points may be set on the known vertex V and the radius arm 50 is perpendicular to the scriber arm 25, as shown in Fig. 1. In this position, the center line of the scriber arm is equivalent to the element of a cone tangent to a constructed sphere which, in turn, is cotangent with the intersected cone and the intersecting plane. To scribe the hyperbola determined by known points F, V, and C, the radius arm 50 is simply swung to a dotted line position as shown in Fig. 1 and the hyperbola is scribed by swinging the scribing arm 25, as indicated in Fig. 2.

It should also be evident that, by adjusting my instrument as for scribing a hyperbola to the three known determining points, my instrument may also be used to locate one of the unknown points if the center, focus, or vertex of a scribed hyperbola is unknown; this use of the instrument can save considerable calculation when either the focus or center is unknown, for an unknown vertex is located by simply noting the intersection of the curve with the line between focus and center. Indeed, if the hyperbola is large enough to permit the asymptotes to be located, the instrument permits the location of the focus to be accomplished without calculation; the center being determined by the intersection of the asymptotes, the nearest point on the curve is the vertex; then by holding the scriber on the vertex, the length of the axis rod and the elevation of the center are adjusted while maintaining the radius arm perpendicular to the scriber arm. When the apex point is perpendicularly above the center, the point 11 marks the focus.

*Scribing a parabola*

Figure 3:
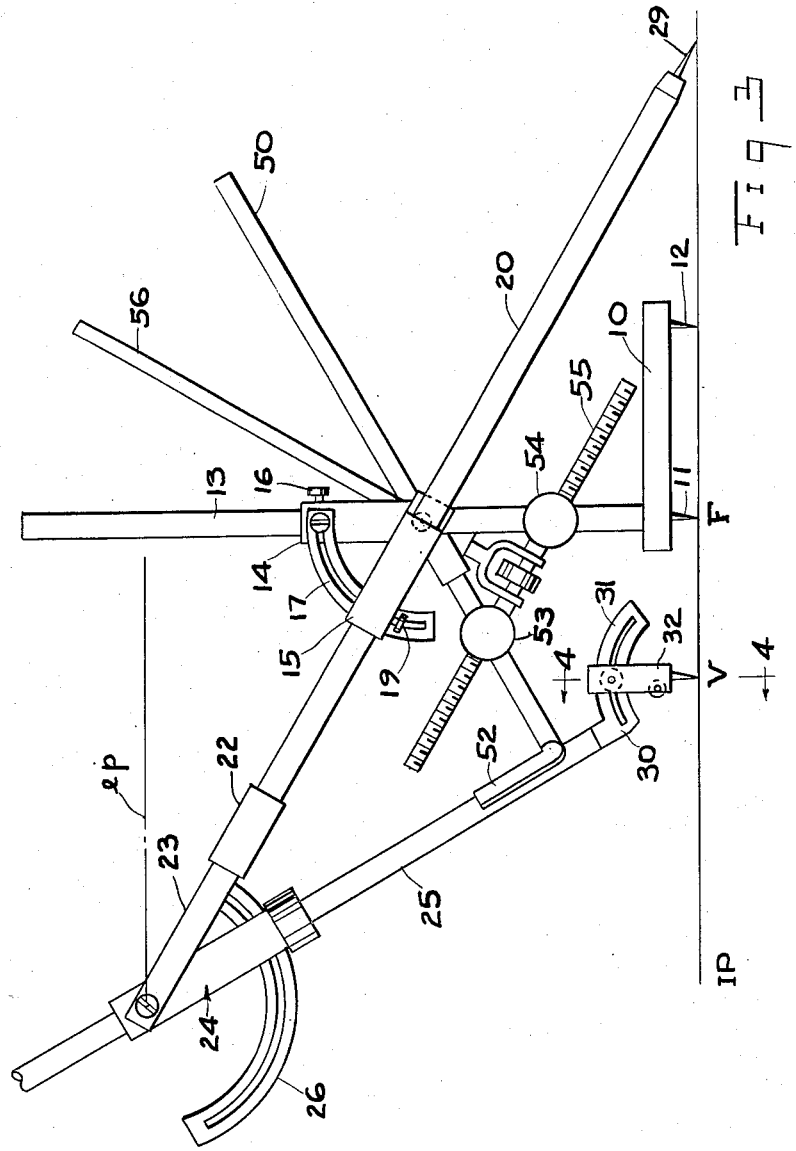
Fig. 3 is an elevation of the other side of the instrument shown in Fig. 1, but with the instrument arranged for scribing a parabola.

To scribe a parabola with a known focus and vertex, the axis rod 20, which, surprisingly, may be of any arbitrary length convenient for the dimensional limitation of the other elements of the instrument, is adjusted in the axial bearing 15 so that the center line of the bearing pivot intersects the mid-point of the length of the rod between the apex point in the fork 23 and the point of the center line pin 29. Maintaining the point of the pin 29 on the plane IP, the pin 11 on the focus $F_p$ and the scriber point on the vertex $V_p$, the center block 14 is elevated and the radius arm 50 is adjusted until the radius arm foot 52 is perpendicular to the scriber arm 25, as shown in Fig. 3. The angularity of the axis rod 20 with respect to the post 13 and the scriber arm bearing with respect to the fork 23 are then set by setting the appropriate quadrant set screws. The parabola is then scribed by swinging the scriber arm about the axis rod while maintaining the scriber in contact with the plane IP, the radius arm being swung out of the way while the parabola is being scribed. That a mathematically precise parabola is scribed is evident from the fact that if the scriber arm 25 were swung until it was vertically above the axis rod 20, the center line of the radius rod, as indicated by the construction line $e_p$, would be necessarily and geometrically parallel to the plane IP. The swinging movement of the scriber arm about the axis rod, therefore, generates a cone having an element $e_p$ parallel to the intersecting plane IP, and the scriber arm 25, accordingly, by moving longitudinally in the bearing 24, marks the locus of points of intersection of the generated cone and the intersecting plane.

If, as is often the case, only the desired location of the focus or vertex is known, the instrument, with the radius arm perpendicular to the scriber arm as shown in Fig. 3, may be set at arbitrary distances between the focus and vertex until a parabola of the desired size and configuration is scribed.

This invention is not limited to the particular mechanisms for effecting the desired movement of the elements of the instrument with respect to each other, as are shown in the preferred embodiment disclosed. The preferred embodiment may be modified in whole or in part by those skilled in the art without departing from the scope of the invention as defined in the following claims.

What is claimed is:

1. A conicgraph for scribing parabolas and hyperbolas comprising a base structure having a focus point, a main bearing member, a support for said main bearing member carried by said base, an axis rod, means slidably and pivotally supporting said axis rod in said main bearing member perpendicularly above said focus point, the perpendicular above said focus point and the axis of said rod intersecting to constitute a first intersection, a scriber arm, means pivotally mounted on one end of said axis rod and rotatably and slidably carrying said scriber arm, the axis of said scriber arm and the axis of said rod intersecting to constitute a second intersection, a scriber carried by said scriber arm and having a scribing point falling on the axis of said arm, means to locate the axis of said scriber arm tangent to a circle lying in the plane defined by said perpendicular and the axis of said rod, said circle being centered on said first intersection and having a radius equal to the distance from said focus point to said first intersection and adjustable means to fix the angles of intersection at said first and second intersections.

2. A conicgraph as defined in claim 1 in which said means to locate the axis of said scriber arm tangent to said circle comprises a radius arm, means for slidably supporting said radius arm pivotally concentrically about said first intersection, a foot carried by said radius arm and extending perpendicularly thereto, said foot being adapted to engage said scriber arm and locate said radius arm perpendicular thereto when said scriber arm is in the plane of said circle, a first pivot bearing carried by said support for said main bearing, and a second pivot bearing carried by said radius arm, the distance from the pivoted axis of said first pivot bearing to the focus point being equal to the distance from the pivotal axis of said second pivot bearing to the axis of said scriber arm when said foot engages said scriber arm, a link extending between said pivot bearings and movable axially therein, and means for maintaining the angle between said link and said main bearing support equal to the angle between said link and said radius arm.

3. A conicgraph as defined in claim 2 in which said link comprises a turn buckle screw threaded in said pivot bearings and said means for maintaining equal angles between said screw and said radius arm comprises a bisector arm in which said turn buckle screw is journaled at its midpoint and perpendicularly to said bisector arm, and a bearing in which said bisector arm is slidably journaled, said bisector arm bearing being pivoted concentrically with said first intersection.

4. A conicgraph as defined in claim 1 in which said means pivotally mounted on said axis rod and rotatably and slidably carrying said scriber arm comprises a fork rotatably mounted about the axis of said axis rod and a bearing pivoted in the tines of said fork about a pivotal axis intersecting the axis of said axis rod and the axis of said bearing at a common point, said bearing comprising a casing having a cylindrical bore, a concentric retaining sleeve within said casing, a plurality of ball openings in said retaining sleeve distributed along the length thereof, and a plurality of balls mounted in said openings, the diameter of said ball openings being less than the diameter of said balls and the inner diameter of said casing, the outer diameter of said sleeve, the diameter of said ball openings and the thickness of said sleeve being proportioned to maintain said balls between said sleeve and casing while permitting said balls to extend through said ball openings when said balls are in contact with the inner diameter of said casing, whereby, when a scriber arm, having a diameter equal to the inner diameter of said casing less twice the diameter of said balls, is journaled in said balls, said scriber arm will be coaxially rotatably and slidably mounted in said casing.

THOMAS S. SAJATOVICH.

References Cited in the file of this patent

UNITED STATES PATENTS

| Number | Name | Date |
| --- | --- | --- |
| 1,088,358 | Nelson et al. | Feb. 24, 1914 |
| 1,228,312 | Garnier | May 29, 1917 |
| 1,921,892 | Sommer | Aug. 8, 1933 |
| 1,924,405 | Hughes | Aug. 29, 1933 |
| 2,268,654 | Goddu et al. | Jan. 6, 1942 |
| 2,307,501 | Goddu et al. | Jan. 5, 1943 |
| 2,385,827 | McKaba | Oct. 2, 1945 |
| 2,452,117 | Ferger | Oct. 26, 1948 |

FOREIGN PATENTS

| Number | Country | Date |
| --- | --- | --- |
| 286,654 | Germany | Aug. 26, 1915 |
| 191,593 | Switzerland | Mar. 16, 1938 |
| 854,680 | France | Jan. 24, 1940 |

OTHER REFERENCES

Frizell, "The Conic Section Compasses," The Mathematical Monthly, vol. 1, October-September, 1858–1859, pages 262–268.